Feb. 12, 1924.  
R. CHILTON  
MOTOR TESTING APPARATUS  
Filed Jan. 17, 1923  
1,483,075  
3 Sheets-Sheet 1
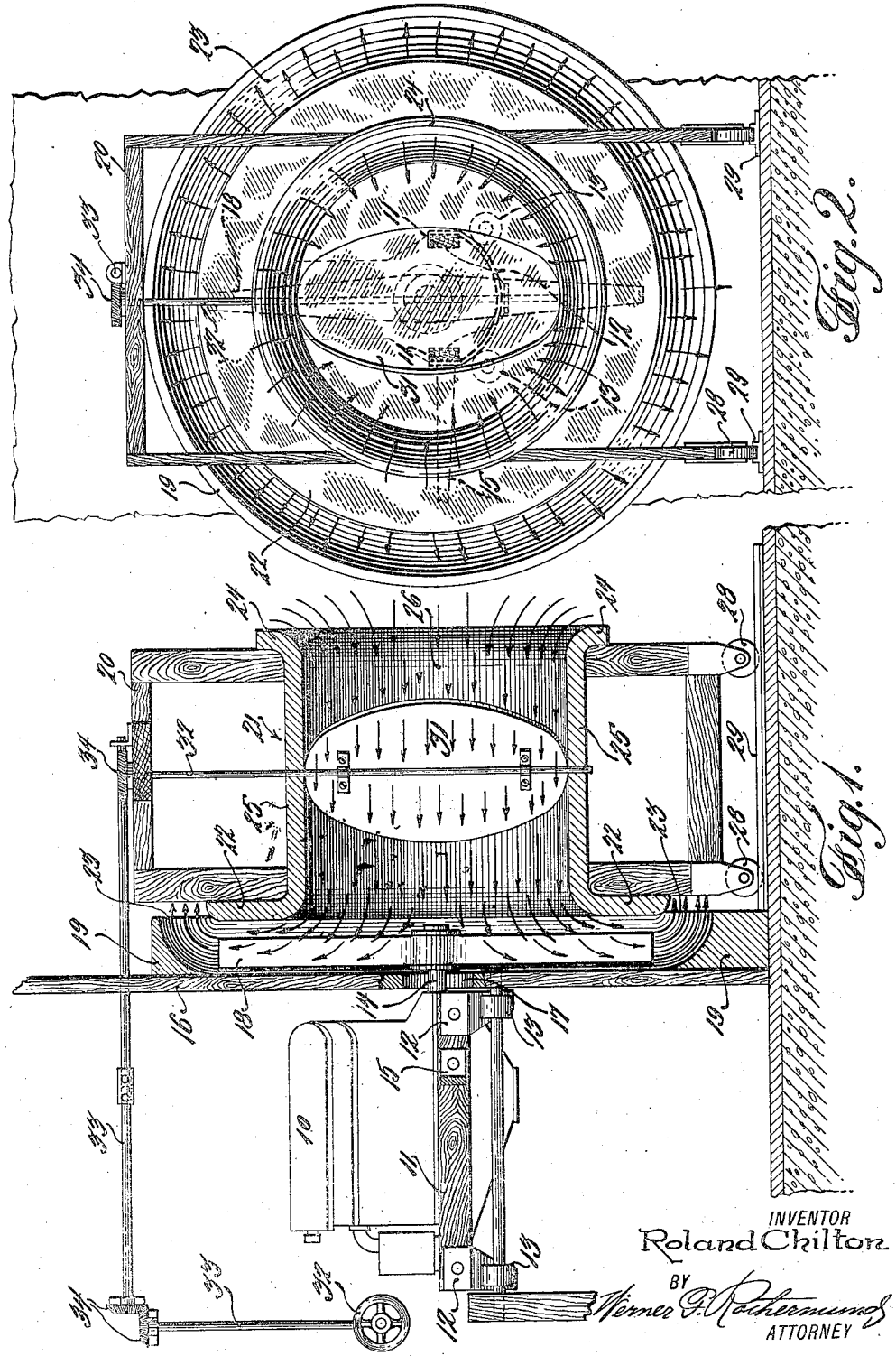

Feb. 12, 1924.
R. CHILTON
1,483,075
MOTOR TESTING APPARATUS
Filed Jan. 17, 1923   3 Sheets-Sheet 2
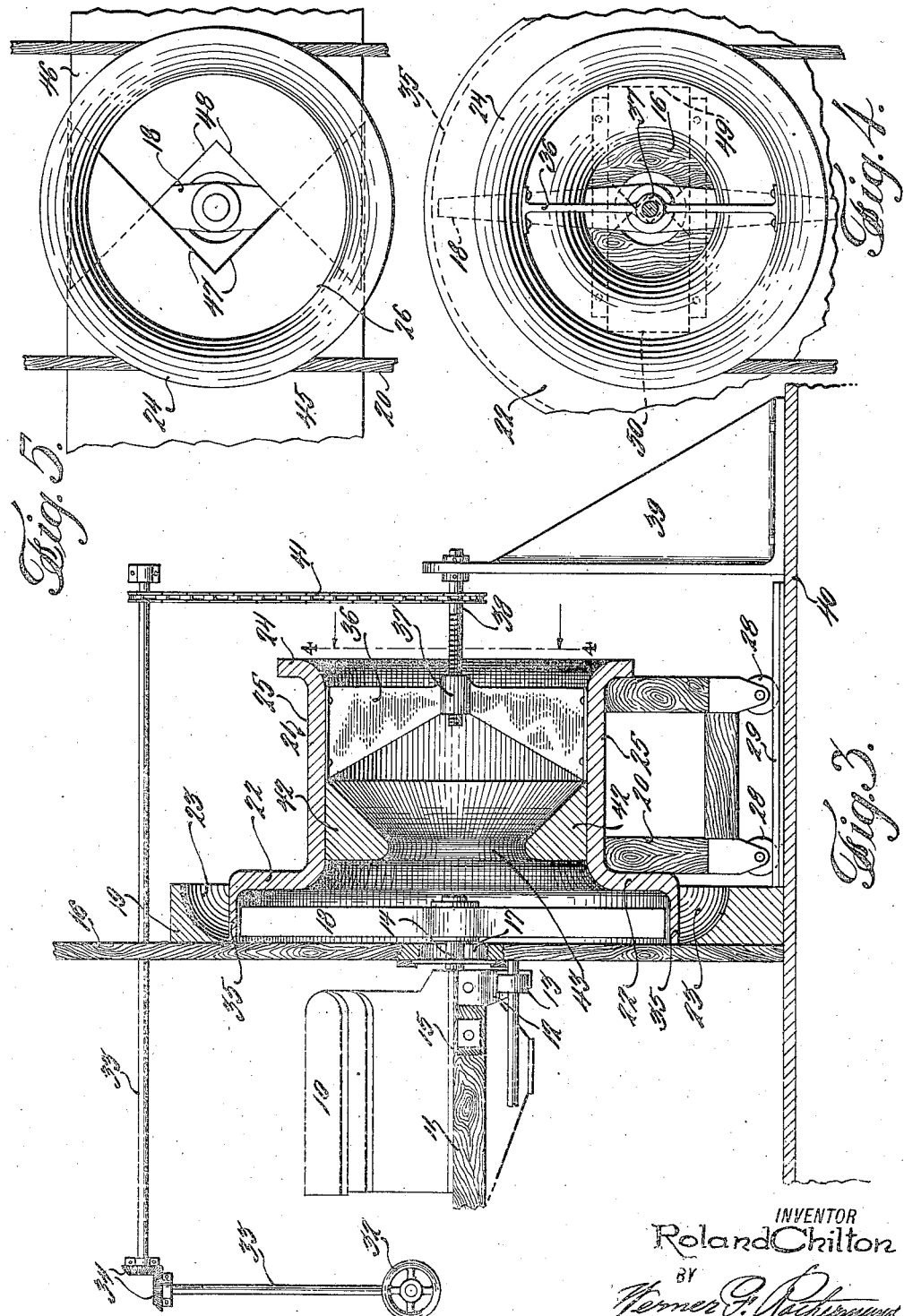
INVENTOR
Roland Chilton
BY
ATTORNEY Feb. 12, 1924.

R. CHILTON
MOTOR TESTING APPARATUS
Filed Jan. 17, 1923

INVENTOR
Roland Chilton
BY
Verner P. Rothermund
ATTORNEY

Patented Feb. 12, 1924.

1,483,075

UNITED STATES PATENT OFFICE.

ROLAND CHILTON, OF KEYPORT, NEW JERSEY, ASSIGNOR TO AEROMARINE PLANE & MOTOR COMPANY, A CORPORATION OF NEW YORK.

MOTOR-TESTING APPARATUS.

Application filed January 17, 1923. Serial No. 613,261.

*To all whom it may concern:*

Be it known that I, ROLAND CHILTON, a subject of the King of England, and a resident of Keyport, in the county of Monmouth and State of New Jersey, have invented certain new and useful Improvements in Motor-Testing Apparatus, of which the following is a specification, reference being had to the accompanying drawings, forming part of this specification.

This invention relates in general to improvements in methods of testing engines and other prime movers and particularly to the method of applying and controlling the brake load or resistance which it is desired to impose on the engine.

The present embodiment contemplates the utilization of the well-known air brake or "club" which is rotated by the drive shaft of the engine and absorbs power due to fluid resistance, usually of the surrounding atmosphere.

This invention is intended to be particularly useful in connection with the testing of aircraft and similar engines. Various kinds of fans and water impellers have been proposed as a braking means for this purpose; but owing to the extremely impulsive torque, to the extreme peripheral speeds involved, and the destructive effects of the great centrifugal forces resulting therefrom, and to the desirability of keeping the momentum or fly-wheel effect of the braking mechanism as small as possible, it is found that a simple test club of the same construction as has proved satisfactory for propellers is the most reliable and efficient form. Such a test club, as used in air as the power absorbing medium, comprises two rectangular-section integral blades extending on either side of the hub portion and tapering in thickness towards the tips.

The power absorbed by such a test club at any given speed when run in open air is a fixed quantity depending upon the size and shape of the club. It is impracticable to change this condition without stopping the engine and substituting a different test club, consequently one club is only useful for testing the engine at one fixed torque and speed relationship. Thus to explore the characteristics of an engine over its whole range of speed and torque, requires a large variety of clubs when these are used in the conventional way. Tests under various speed and torque conditions are therefore usually made with electric dynamometers or other relatively expensive apparatus which afford a control of the torque and speed relationships over a wide range.

In connection with aircraft engines in particular, there are many advantages, such as outlined above, associated with the use of a simple club for testing, and for long tests at fixed speed and torque, such clubs are now used in preference to other apparatus. It is one of the principal objects of this invention to afford means whereby the power absorption of a test club at any speed can be controlled, and a further object is to increase the maximum power absorption capacity of a given size of test club.

The resistance of a test club as usually used, that is to say, running out in the open, so that the air is free to eddy around it on all sides, is considerably less than the resistance offered if the air is led in to the club at the center through a suitable and preferably stream-lined duct and then led out at the periphery through an annular duct designed to reduce eddying. This is because the horse-power absorbed by the club is a function of the total mass of air which it deals with in a given time and of the velocity to which it accelerates that mass of air. Accordingly two of the objects of this invention are achieved by affording means whereby the quantity of air dealt with by the club is materially increased when maximum power absorption is required and other means whereby the quantity of air flowing to the club can be definitely controlled and whereby the resistance of the club can be varied at will. In fact when the flow of fresh air to the club is stopped altogether, the air in the immediate neighborhood of that member merely rotates with it without undergoing acceleration and therefore without absorbing power other than that created by the friction of the air on the surrounding walls which are therefore preferably made smooth in the structure featured in this disclosure.

One suitable means of controlling the quantity of air dealt with by the club consists of a manually controlled damper situated in the air intake duct and such a means is shown on the drawings. It will be obvious that there are other means whereby the control of the air flow to the club, which is one of the principal features of this invention, can be put into effect.

In cases where it is desired to carry the range of torque control down to a very low point, it may be desirable to close the outlet duct and so avoid the eddying which will occur when the damper of Fig. 1 is closed. Figs. 3 and 4 show an alternative construction whereby the controlling of the air flow is done at the outlet duct. As in the showing of Figs. 1 and 2 the partition between the engine and the club is fixed and constitutes one wall of the air closure around the club. In the case where peripheral control is desired, an annular extension may be added to the intake duct and disc and the whole may be moved axially so that this peripheral ring contacts with the fixed partition for extreme low torque conditions or is withdrawn by a suitable control to the high torque position wherein the full area of the outlet duct will be developed. It is desirable that the surfaces exposed to air flow should be smooth since the horse-power absorbed when the air flow is shut off is merely that due to the friction of the air which then rotates with the club against these walls, plus whatever eddying may occur. In the case of the inlet control this eddying occurs in the outlet duct and may be very violent where a test club with only two blades is used. On the other hand with peripheral control no eddying occurs at the tips of the blades, but eddy currents may then be set up in the intake duct unless this be also closed up in sympathy with the closing at the periphery. Such eddy currents in the intake will absorb relatively small power however, because they occur towards the center of the club where the velocities are relatively low. However, in the case where a small diameter club is used in conjunction with a large intake duct such eddying currents might reach a sufficient intensity to absorb relatively high power, and so cut down the power control range, and in such cases a choke piece such as indicated in Fig. 3 is contemplated whereby the diameter of the inlet is reduced so that the eddying will be confined to a relatively small diameter of air stream.

While air has been referred to in the foregoing as the most convenient power absorbing fluid medium, this invention is not limited to the use of that particular fluid. In cases where extreme compactness of the apparatus or very high specific power absorption is required, the spirit of this invention is not departed from by utilizing water, for example, in place of air, as shown in Fig. 6. In that case a relatively small diameter impeller, preferably of metal, would take the place of the test club and the structure for guiding the water would be of relatively much smaller size, and would have to be designed to sustain much greater fluid pressures than occur in the case of air, and the whole apparatus would be immersed in a tank containing the power absorbing medium.

Various other objects and advantages of the invention will be in part obvious from an inspection of the accompanying drawings and in part will be more fully set forth in the following particular description of one form of- mechanism embodying my invention, and the invention also consists in certain new and novel features of construction and combination of parts hereinafter set forth and claimed.

In the drawings:—

Figure 1 is a vertical section of the preferred form taken approximately at the center.

Figure 2 is a view in elevation of the right hand end as shown in Fig. 1.

Figure 3 is a vertical section taken approximately at the center showing a modification of the form shown in Fig. 1.

Figure 4 is a fragmentary section view of Fig. 3 taken on the line 4—4 looking in the direction as indicated by the arrows.

Figure 5 is a fragmentary right hand end view showing a modification of the air control means.

Figure 6:
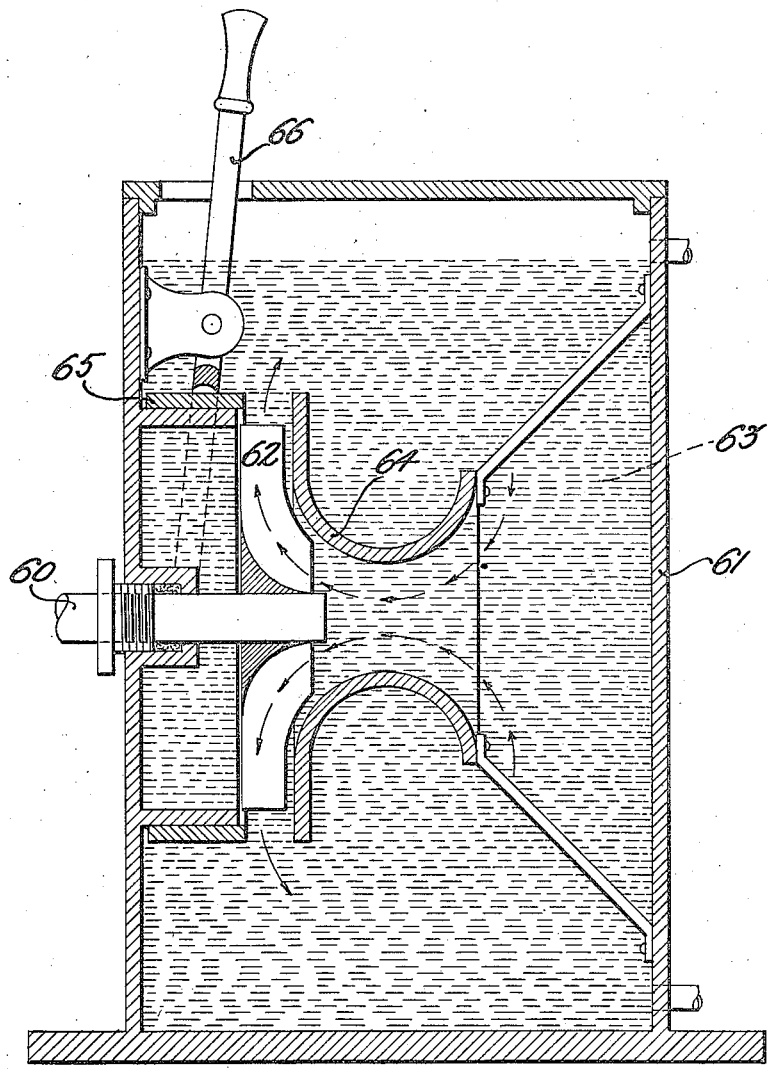
Figure 6 is a vertical section graphically illustrating in a diagrammatic manner an alternative construction in which water is utilized in place of air.

As illustrated in the drawings 10 designates a conventional form of internal combustion engine such as generally used in aeroplane construction.

With reference to Figs. 1 and 2 an engine 10 is secured to the bearers 11 having arc shaped members 12 which bear on the rollers 13 in such a manner as to permit of the engine being rocked about the center of its crank-shaft 14. The rollers are supported in any suitable manner such as that shown.

To one of the bearers 11 there is secured a laterally extending arm 15 the other end of which is conveniently connected to a set of scales, (not shown) so as to permit of the torque reaction of the engine being determined thereby. The above described structure is well-known to those skilled in the art and is not in itself a feature of this invention.

Adjacent to the propeller end of the crankshaft 14 there is disposed a substantially vertical wall 16 having an auxiliary air passage or opening 17 through which the crankshaft projects.

On the side of the wall 16 opposed to that of the engine there is mounted for rotation with the crankshaft an air brake or test "club" 18.

An annular concaved deflector 19 is secured to the wall 16 and is of such construction as to deflect air currents axially.

Axially arranged with the crankshaft and supported upon the frame work 20 I have constructed a preferably cylindrical tunnel 21 having walls 25. A flange portion 22 is provided thereon of such diameter so as to form an outlet duct or opening 23 between said flange and the concaved deflector 19. The wall 16 and the flange 22 form a casing for the club 18. The opposite end of the tunnel is preferably flared out at 24 to facilitate the entrance of air into the air intake duct 26.

The framework 20 is provided with rollers 28 operating on the rails 29 so as to permit of the tunnel 21 being moved outwardly to afford space for the removal of the "club" from the crankshaft.

In the duct 26 I have placed an adjustable closure or damper 31 forming an air control so that the flow of air through the duct 26 can be increased or decreased or interrupted entirely when so desired. The damper 31 can be operated from a position adjacent the engine 10 by a hand wheel 32 through the intermediate shafts 33 and gears 34.

It will be readily understood that when the "club" 18 is caused to rotate rapidly by the engine, the air will be drawn through the duct 26 and forced out at the opening 23 as indicated by the arrows, the rate of flow being controlled by the damper 31.

In Figs. 3 and 4 I have shown an alternative construction in which the flange 22 has been extended cylindrically at 35 in order to afford the peripheral air control hereinbefore mentioned. The wall 16, the flange 22 and the extension 35 in this instance form a casing for the test club. In the duct 26 I have secured a webbed member 36 having an enlarged portion 37 forming a nut for a screw threaded shaft 38 rotatably mounted in a rugged bracket 39 preferably secured to the floor portion 40. The shaft 38 is provided with a chain and sprocket connection 41. It will be understood that when it is desired to adjust the flow of air past the club with the construction as shown in Figs. 3 and 4, the tunnel can be moved axially on the rollers 28 toward or away from the wall 16 and the deflector 19 so as to increase or decrease the opening 23, said movement being accomplished by the operation of the hand wheel 32, and thereby the shafts 33, gears 34 and the chain and sprocket connection 41. It is obvious that the damper 31 can in this instance be dispensed with. A choke piece 42 can be provided having an opening 43 and secured in the tunnel 21 in any suitable manner, the purpose of which has been described hereinbefore.

With reference to Fig. 5 I have shown a modification of the air control means in which two laterally slidable members 45, 46 having V shaped cut out portions 47, 48 can be inserted in the tunnel 21 in place of the damper 31 and the velocities of air governed by adjusting these slides so as to increase or decrease the opening 47, 48.

The auxiliary opening 17 through which the crankshaft passes can be closed or opened in a similar manner as described above by the slides 49, 50 Fig. 4 when it becomes desirable to circulate air over the engine for the purpose of cooling the same.

With reference to Fig. 6 of the drawings, I have shown a structure by which water may be utilized in place of air, as referred to in the foregoing, in which a crankshaft extension 60 may be mounted in a suitable bearing of the tank 61. The impeller 62 is secured to the shaft for rotation therewith and displaces a fluid 63 as indicated by the arrows, said fluid being conveyed adjacent to the center of rotation by a throat 64. A means is provided for controlling the flow by the axially shiftable closure 65 operated in any suitable manner as by the bifurcated lever 66. A gate may be provided within the throat 64, similar to the one shown in Fig. 1, in place of the means 65 for controlling the flow.

Variations may be resorted to within the scope of the invention and portions of the improvements may be used without others whilst not departing from the spirit of the invention.

Having thus described my invention, I claim:—

1. In the art of testing an engine, a test club adapted for rotation in a fluid and drivably secured to the engine to be tested, in combination with means for controllably leading said fluid to the center of said club.

2. In the art of applying a brake load to a prime mover for testing the same, a rotating member driven by the prime mover and rotating in a fluid, means associated with said rotating member to guide the fluid into the center thereof and out at the periphery thereof in combination with means for controlling the rate of flow of the fluid.

3. In the art of testing an aircraft engine, a test club drivably attached to the engine, means for admitting air in controllable quantities at the axis of said club and for discharging said air at the periphery of said club.

4. In the art of testing a prime mover, a rotating member driven by the prime mover and adapted to accelerate a fluid from the center of rotation outwardly, means for controlling the quantity of fluid presented for such acceleration.

5. An air dynamometer comprising, a test club secured to an engine to be tested, a casing around the club, a duct leading to the center of said casing and having means for controlling the rate of flow of air therethrough.

6. An engine testing dynamometer comprising means for mounting the engine for measuring its torque reaction, a test club driven by the engine to be tested, means for guiding air for displacement by said test club and means for controlling the rate of flow of the air so guided.

7. An air dynamometer for testing engines comprising, a rotary member driven by the engine coacting with suitable passages to induce a flow of air at and about the center of rotation and to discharge same at the periphery of the rotating means, and means for controlling the rate of induction or discharge of said air.

8. An air dynamometer comprising means for mounting an engine for measuring the torque reaction of the same, a rotating member driven by the engine and having substantially radial blades adapted to displace air centrifugally and means for controlling the rate at which said air is presented for such displacement.

9. In apparatus of the class described, an engine to be tested having a propeller hub, a substantially radial armed fan adapted to be secured directly to said hub and means for controlling the flow of air to said fan.

10. In apparatus for testing a prime mover having a drive shaft, a test club attached to the drive shaft, a wall on one side of said test club coacting with a casing having an inlet duct and disposed on the other side of said club to form a casing around said club and having a peripheral opening which can be varied by axial movement of the casing to and from said wall.

11. In apparatus for testing a prime mover having a drive shaft, a test club attached to the drive shaft, a fixed wall on one side of the test club coacting with a casing having an inlet duct and disposed on the other side of said club and means to retract casing from the wall so as to afford an outlet duct of adjustable area at the periphery of said test club.

12. In apparatus of the class described, the combination with an engine having a crankshaft, of a test member mounted for rotation therewith, a casing wherein said test member is rotated, means adapted to convey a fluid to the test member adjacent the center of rotation thereof, means adapted for the expulsion of the fluid by said test member at a point remote from the center of rotation thereof and other means whereby the rate of flow of the fluid so conveyed can be controlled.

13. In apparatus of the class described, the combination with an engine having a crankshaft, of a test member mounted for rotation therewith, a casing wherein said test member is rotated, an intake duct adapted to convey a fluid to the test member, said intake duct mounted in a manner so as to permit axial movement thereof, a damper in said intake duct, means for operating said damper and a duct adapted to permit of the expulsion of said fluid.

14. In apparatus of the class described, the combination with an engine having a crankshaft, of a test member mounted for rotation therewith, a casing wherein said test member is rotated, a tunnel comprising a duct adapted to convey a fluid to the test member, an outlet duct for said fluid, means associated with said tunnel to open or close the outlet duct when the tunnel is moved axially and means for axially moving said tunnel.

15. In apparatus of the class described, the combination with an engine having a crankshaft, of a test member mounted for rotation therewith, a casing wherein said test member is rotated, a duct having walls adapted to convey a fluid to the test member, means to control the volume of fluid so conveyed.

16. In apparatus of the class described, the combination with an engine having a crankshaft, of a test member mounted for rotation therewith, a casing wherein said test member is rotated, a duct having walls adapted to convey a fluid to the test member, means to control the volume of fluid so conveyed, said means comprising a member adapted to form graduated openings within said duct and concentric with the walls thereof, and means to permit of the expulsion of the fluid from the casing.

17. In an engine testing device, the combination of an engine having a crankshaft, of a test club attached thereto, a wall portion between said engine and said test club, an auxiliary air passage in said wall portion adjacent the crankshaft, means for closing said passage, a casing around the club, an air inlet duct axially arranged with the crankshaft and adapted to conduct air to the center of rotation of the club, means for controlling the volume of air admitted to said air inlet duct and other means whereby the air will be expelled at the periphery of said club.

18. In apparatus of the class described, the combination with an engine having a crankshaft, of a test member disposed within a casing and mounted for rotation with the crankshaft in a manner so as to displace a fluid when so rotated and means for controlling the rate of flow of the fluid displaced by said test member.

19. In apparatus of the class described, the combination with a motor having a drive shaft, of a test member disposed within a casing and mounted for rotation by the drive shaft in a manner so as to displace a fluid when so rotated, an inlet duct for a fluid, an outlet duct for a fluid, a constriction in the inlet duct and means for controlling the rate of flow of the fluid displaced by the test member.

20. In apparatus of the class described, the combination with a motor to be tested, of a container, a fluid therein, a shaft within the container and driven from said motor, an impeller on the shaft, means for conveying the fluid to a point adjacent the center of rotation of said impeller, and means to control the rate of flow of the fluid so conveyed.

21. In the art of conveying a fluid in controllable quantities to the test member of an engine, a casing around the test member, a barrel member adjacent to said test member and an adjustable closure for the barrel member.

22. In the art of conveying a fluid in controllable quantities to a test member of an engine, a casing around the test member, a barrel member axially movable toward or away from said casing, and means for so moving said barrel member.

Signed at Keyport, in the county of Monmouth and State of New Jersey, this 12th day of January, A. D. 1923.

ROLAND CHILTON.